United States Patent
Srivatsan et al.

(10) Patent No.: US 10,924,372 B2
(45) Date of Patent: Feb. 16, 2021

(54) COMPUTING SYSTEM PROVIDING ENHANCED POINT OF PRESENCE (PoP) SERVER SELECTION BASED UPON NETWORK HEALTH METRICS AND RELATED METHODS

(71) Applicant: CITRIX SYSTEMS, INC., Fort Lauderdale, FL (US)

(72) Inventors: Karthick Srivatsan, Karnataka (IN); Marco Murgia, Los Gatos, CA (US); Chaitra Maraliga Ramaiah, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 86 days.

(21) Appl. No.: 16/007,043

(22) Filed: Jun. 13, 2018

(65) Prior Publication Data
US 2019/0386904 A1 Dec. 19, 2019

(51) Int. Cl.
*H04L 12/26* (2006.01)
*H04L 29/08* (2006.01)
*H04L 29/06* (2006.01)

(52) U.S. Cl.
CPC ........ *H04L 43/0829* (2013.01); *H04L 43/087* (2013.01); *H04L 67/16* (2013.01); *H04L 67/42* (2013.01)

(58) Field of Classification Search
CPC .................................................. H04L 43/0829
See application file for complete search history.

(56) References Cited

U.S. PATENT DOCUMENTS 7,454,500 B1 * 11/2008 Hsu ..................... H04L 67/1008
  709/203
2003/0039212 A1 2/2003 Lloyd et al.
2009/0080336 A1 * 3/2009 Zhang ..................... H04L 43/00
  370/248

(Continued)

OTHER PUBLICATIONS

Lou et al. "Device-to-Device Service Selection Framework in Cloud Radio Access Network" 2015 29th International Conference on Advanced Information Networking and Applications Workshops: Feb. 24, 2015; pp. 633-637.

*Primary Examiner* — Tonia L Dollinger
*Assistant Examiner* — Ishrat Rashid
(74) *Attorney, Agent, or Firm* — Allen, Dyer, Doppelt + Gilchrist, PA

(57) ABSTRACT

A computing system may include point of presence (PoP) servers coupled to a wide area network (WAN) and configured to receive client requests for a Software as a service (SaaS) application(s) from different network branches coupled to the WAN, and connect the network branches with a given SaaS host server from among different SaaS host servers coupled to the WAN and providing the SaaS application(s). The system may also include a PoP selection controller (PSC) coupled to the WAN and cooperating with the PoP servers to determine first network health metrics for connections between the PoP servers and the network branches, determine second network health metrics for connections between the PoP servers and the SaaS host servers, and select a respective PoP server for each network branch to be connected with for providing the SaaS application(s) based upon the first and second network health metrics.

19 Claims, 7 Drawing Sheets

(56) References Cited

U.S. PATENT DOCUMENTS

| | | | |
|---|---|---|---|
| 2011/0276446 A1* | 11/2011 | Gupta | G06Q 10/06 |
| | | | 705/34 |
| 2013/0304796 A1 | 11/2013 | Jackowski et al. | |
| 2015/0262268 A1* | 9/2015 | Padmanabhan | H04L 63/08 |
| | | | 705/34 |
| 2016/0269927 A1* | 9/2016 | Kim | H04L 45/121 |
| 2016/0295394 A1* | 10/2016 | Mijar | H04W 8/065 |
| 2017/0111261 A1* | 4/2017 | Francois | H04L 45/122 |
| 2017/0324628 A1 | 11/2017 | Dhanabalan | |

* cited by examiner

COMPUTING SYSTEM PROVIDING ENHANCED POINT OF PRESENCE (POP) SERVER SELECTION BASED UPON NETWORK HEALTH METRICS AND RELATED METHODS

BACKGROUND

The cloud has become a repository of various services, including Software as a Service (SaaS) applications. In recent years, access to the cloud has grown significantly with millions of clients now using cloud service offerings. To enhance user experience, service providers strive to provide cloud-based services in the most efficient manner.

In this regard, a relatively new approach for providing SaaS applications is the use of co-locations (COLOs), which allow an enterprise to "spin up" multiple co-locations with their SaaS inventory and use intermediary points of presence (POPs) for catering to the end destination more easily. In fact, there may be multiple such POPs, or a perimeter of POPs, that network branches use to reach an end destination.

Typically, PoP selection for a client requesting a cloud service is performed on a geo-centric basis. That is, network branches typically just use the geographically closest PoP to satisfy SaaS client requests. In the basic SaaS infrastructure, a client requests a service through a PoP which connects to the appropriate hosting service. A service requesting client gets served from a POP which is co-located in the same zone or the "nearest" zone by virtue of its proximity. In theory, this approach aligns naturally, but in reality there may be other problems or factors which result in the closest PoP not providing the fastest and/or most reliable delivery of the application.

SUMMARY

A computing system may include a plurality of point of presence (PoP) servers coupled to a wide area network (WAN) and configured to receive client requests for at least one Software as a service (SaaS) application from a plurality of different network branches coupled to the WAN, and connect the network branches with a given SaaS host server from among a plurality of different SaaS host servers coupled to the WAN and providing the at least one SaaS application. The system may also include a PoP selection controller (PSC) coupled to the WAN and cooperating with the PoP servers to determine first network health metrics for connections between the PoP servers and the network branches, determine second network health metrics for connections between the PoP servers and the SaaS host servers, and select a respective PoP server for each network branch to be connected with for providing the at least one SaaS application based upon the first and second network health metrics.

In accordance with one example implementation, the PSC may be further configured to calculate composite health metrics for each PoP server based upon the first and second network health metrics associated therewith, and the PSC may select the respective PoP server for each network branch based upon the composite health metrics. Furthermore, the PSC may also be further configured to determine a PoP health metric associated with each of the PoP servers, and the PSC may select the respective PoP server for each network branch also based upon the PoP health metrics.

By way of example, the first and second network health metrics may comprise at least one of packet loss metrics, latency metrics, and jitter metrics. In an example embodiment, the PoP servers may be configured to perform source network address translation (SNAT) on client requests received from the network branches to cause the SaaS host servers to deliver the at least one SaaS application via the same PoP servers from which the client requests were received.

Furthermore, the PSC may also be configured to maintain a lookup table of the PoP servers ranked based upon the first and second health metrics. Moreover, the PSC may be further configured to update the lookup table at an interval in a range of 250 milliseconds to 10 seconds, for example. Additionally, each PoP server may include a health metric module to calculate the first and second health metrics and provide the calculated first and second network health metrics to the PSC.

A related method is also provided for selecting a PoP server from among a plurality of PoP servers coupled to a WAN and configured to receive client requests for at least one SaaS application from a plurality of different network branches coupled to the WAN, and connect the network branches with a given SaaS host server from among a plurality of different SaaS host servers coupled to the WAN and providing the at least one SaaS application. The method may include determining first network health metrics for connections between the PoP servers and the network branches at a PSC, determining second network health metrics for connections between the PoP servers and the SaaS host servers at the PSC, and selecting, at the PSC, a respective PoP server for each network branch to be connected with based upon the first and second network health metrics.

A non-transitory computer-readable medium is also provided for a PSC for use with a plurality of PoP servers coupled to a WAN and configured to receive client requests for at least one SaaS application from a plurality of different network branches coupled to the WAN, and connect the network branches with a given SaaS host server from among a plurality of different SaaS host servers coupled to the WAN and providing the at least one SaaS application. The non-transitory computer-readable medium may have computer-executable instructions for causing the PSC to perform steps including determining first network health metrics for connections between the PoP servers and the network branches, determining second network health metrics for connections between the PoP servers and the SaaS host servers, and selecting a respective PoP server for each network branch to be connected with based upon the first and second network health metrics.

DETAILED DESCRIPTION

The present description is made with reference to the accompanying drawings, in which example embodiments are shown. However, many different embodiments may be used, and thus the description should not be construed as limited to the particular embodiments set forth herein by way of example. Like numbers refer to like elements throughout.

As will be appreciated by one of skill in the art, various aspects described herein may be embodied as a method, a data processing system, or a computer program product. Accordingly, those aspects may take the form of an entirely hardware embodiment, an entirely software embodiment or an embodiment combining software and hardware aspects (e.g., microprocessor, etc.). Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1A:
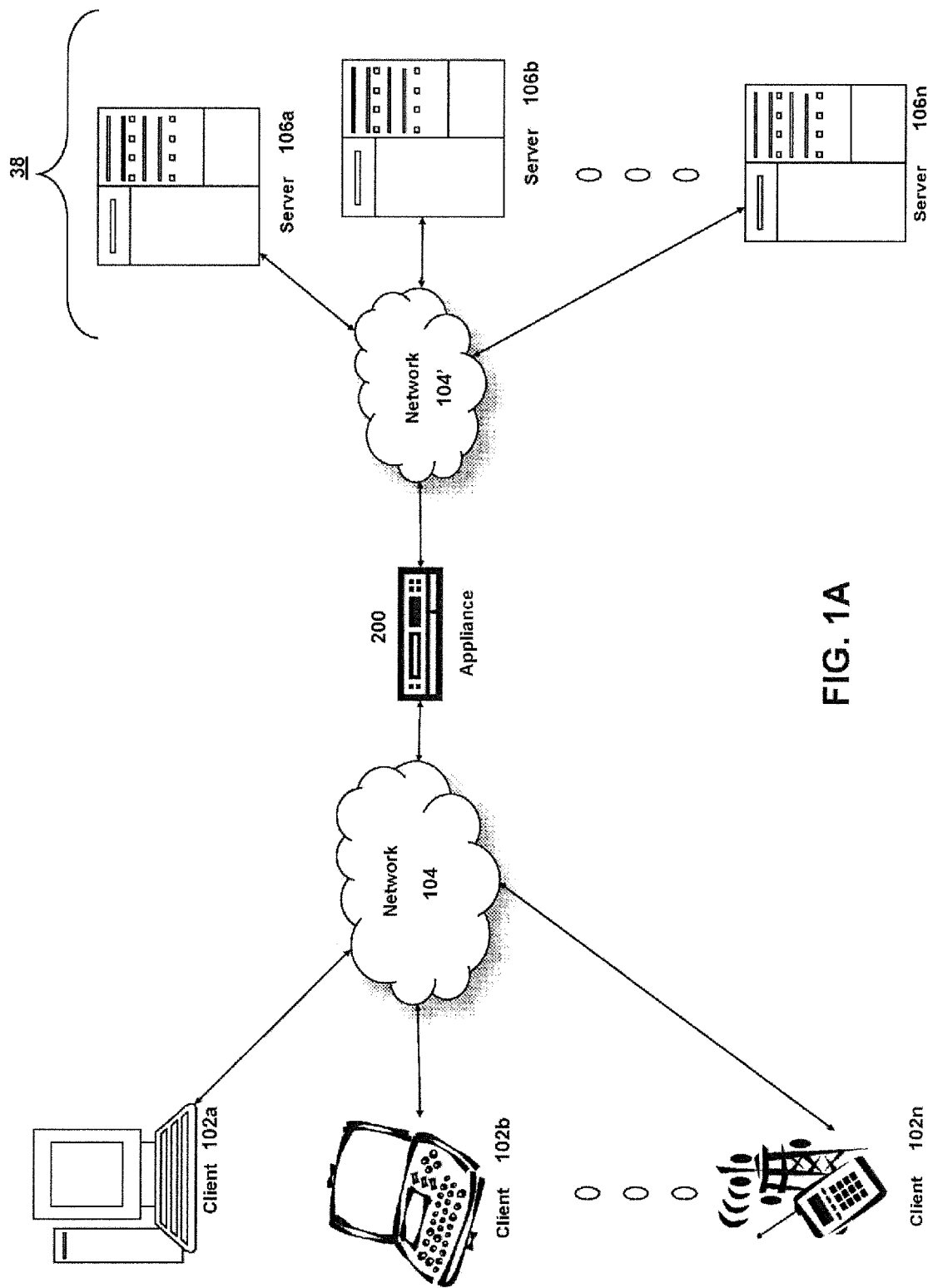
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment illustratively includes one or more clients $102a$-$102n$ (also generally referred to as local machine(s) 102, or client(s) 102) in communication with one or more servers $106a$-$106n$ (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104.

The networks 104 and 104' may be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may include a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, e.g., as shown in FIGS. 1A-1D, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 may be implemented using network devices manufactured by Citrix Systems, Inc. of Ft. Lauderdale Fla., referred to as Citrix NetScaler devices. In other embodiments, the appliance 200 may implemented using product embodiments referred to as WebAccelerator and BigIP manufactured by F5 Networks, Inc. of Seattle, Wash. In another embodiment, the appliance 205 may be implemented using DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 may include an application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 may include a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
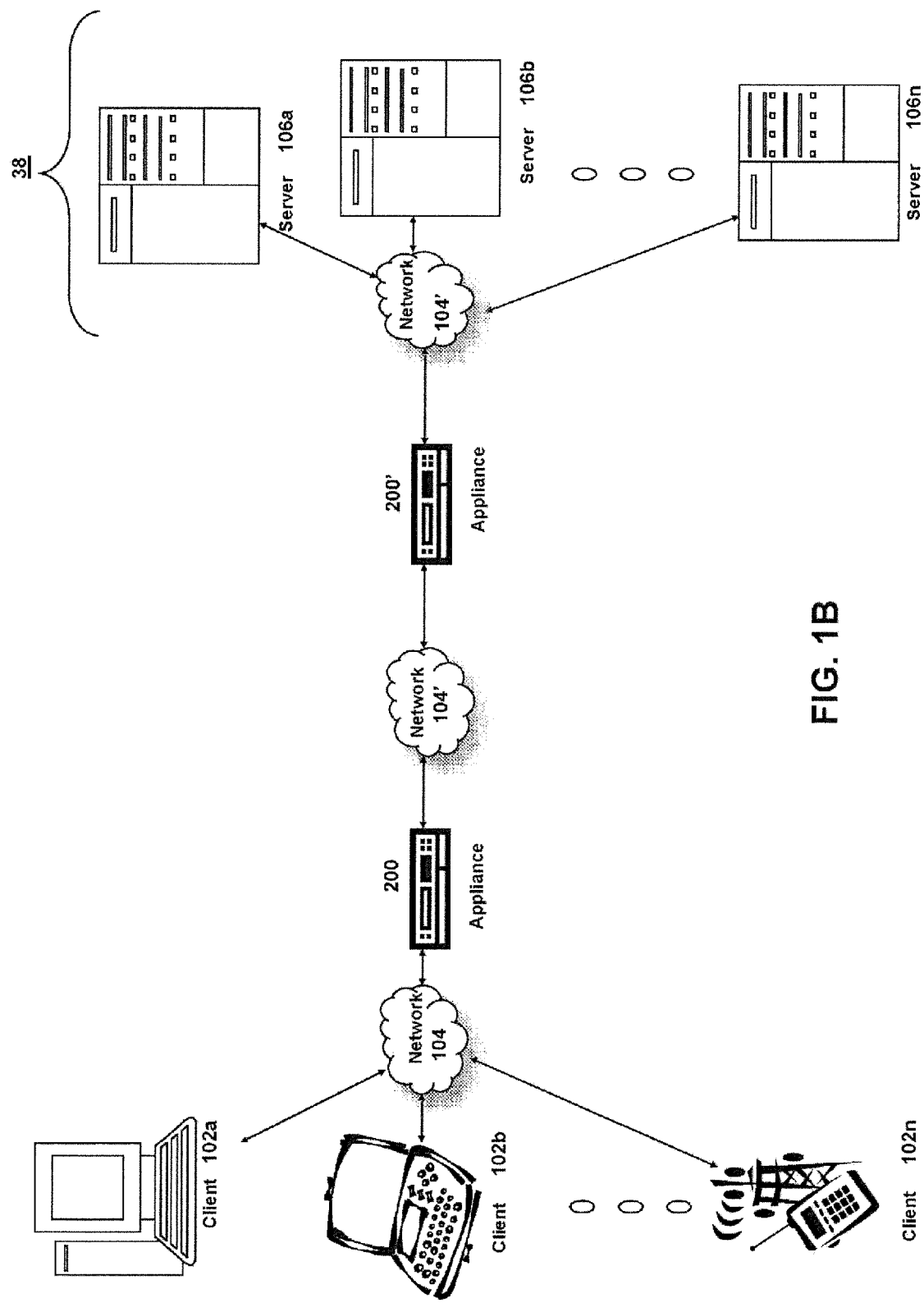
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Further details regarding network computing environments are provided in U.S. Pat. Pub. No. 2017/0324628 to Dhanabalan, which is assigned to the present Applicant and is hereby incorporated herein by reference in its entirety.

Figure 2:
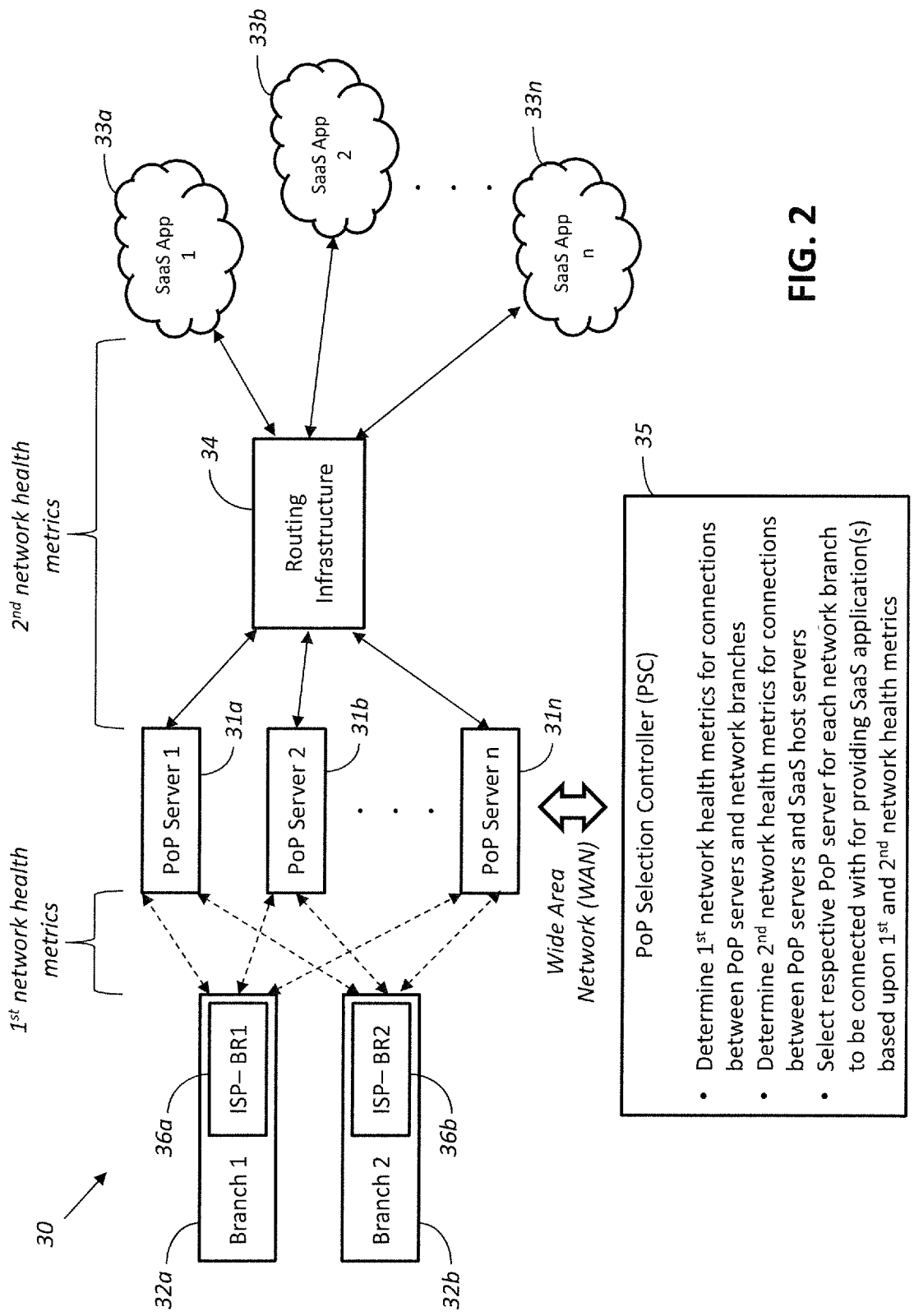
FIG. 2 is a schematic block diagram of a computing system in accordance with an example embodiment providing enhanced Point of Presence (PoP) selection for Software as a Service (SaaS) application requests.
Figure 5:
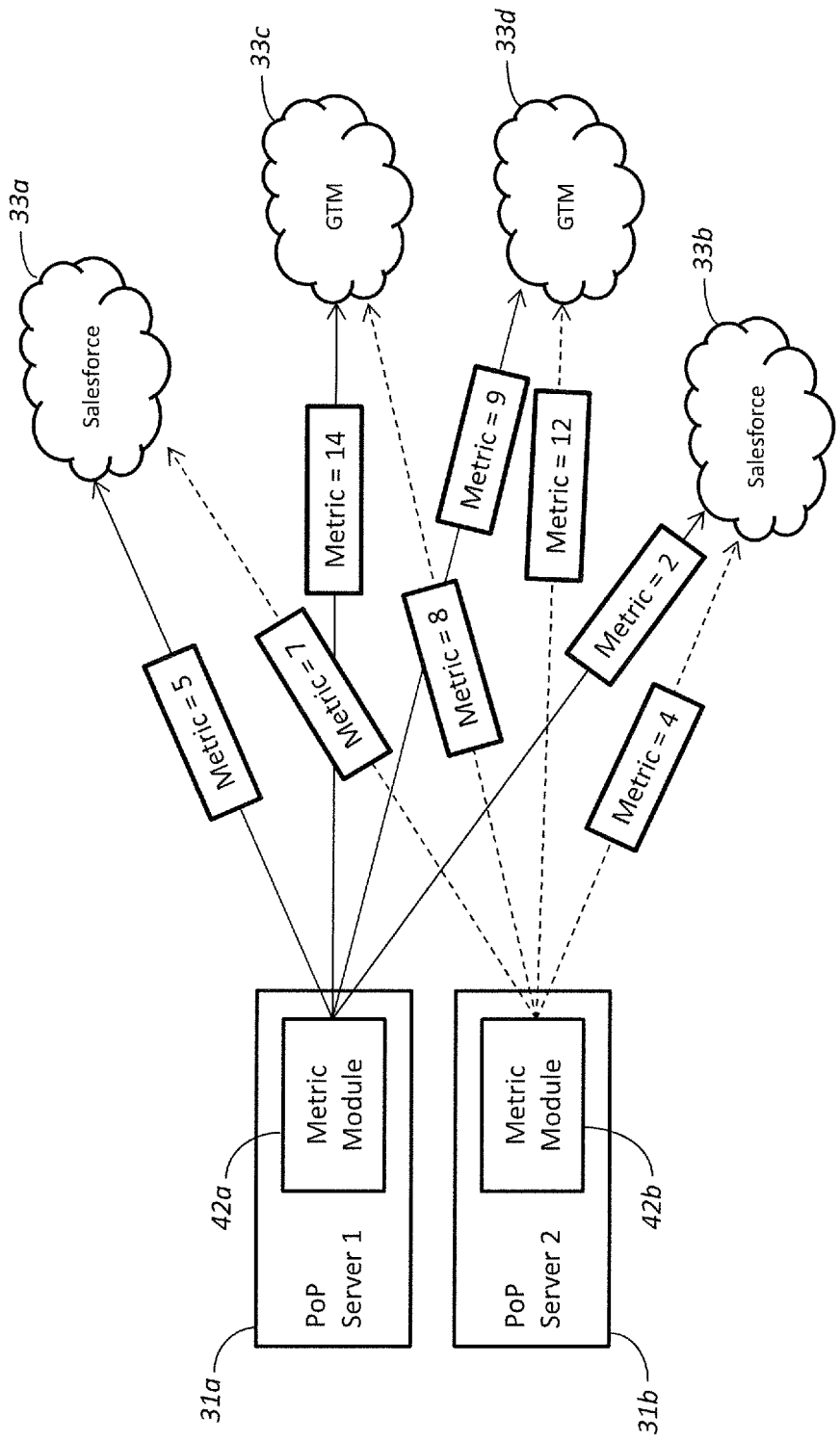
FIG. 5 is a schematic diagram illustrating network metric calculation between the PoP servers in the example of FIG. 4 and a plurality of different SaaS host servers.

Turning now to FIG. 2 and the flow diagram 90 of FIG. 5 which beings at Block 91, a computing system 30 and associated method aspects are first described. The system 30 illustratively includes a plurality of geographically distributed point of presence (PoP) servers 31a-31n coupled to a wide area network (WAN) (e.g., the Internet) and configured to receive client requests from a plurality of different network branches or appliances 32a, 32b also coupled to the WAN and servicing different clients. In some embodiments, one or more of the branches may be implemented as virtual computing branches. As noted above, the PoP servers 31a-31n connect the network branches 32a, 32b to different services, such as cloud-based Software as a service (SaaS) applications hosted by SaaS host servers 33a-33n via the appropriate routing infrastructure 34. Each branch 32a, 32b illustratively includes a hosting service connection interface 36a, 36b. It will be appreciated that reference to a PoP server or SaaS server instance herein may include one or more servers. That is, a PoP may be implemented using multiple servers, and a given SaaS host location may also utilize multiple servers in some embodiments.

As also noted above, the typical approach for serving a PoP for fulfilling a SaaS request is to provide the PoP that is geographically closest to the requesting branch. For example, in a typical approach branch 32a might reach out to PoP server 31a if they both are in the same geographic zone. However, although the PoP server 31b may be in a different geographical zone, it may in fact be a better PoP server than the branch 32a at that point in time for servicing the SaaS request. That is, despite the geographic proximity of the PoP server 31a to the branch 32a, other parameters beside proximity come into play with respect to end-to-end delivery of SaaS services. For instance, such factors may include the general "health" of the different PoP servers 31a-31n, as well as network parameters associated with different paths through the WAN, such as packet loss, latency, jitter, etc., which affect service availability.

As a result, in several instances proximity-based selection alone will not provide enough of a vector to select the most appropriate PoP for a given application delivery. However, the system 30 advantageously allows for multiple vectors to be used in the PoP server selection process, such as WAN health (e.g., loss/latency/jitter) and a PoP server's availability. The system 30 accordingly may provide a more granular control over the selection criteria to find the appropriate PoP server 31a-31n to service requests from a given network branch 32a, 32b for a particular SaaS application, which in some cases will not be the PoP server that is geographically closest to the branch.

More particularly, the system 30 further illustratively includes a PoP selection controller (PSC) 35 coupled to the WAN and cooperating with the PoP servers 31a-31n to determine first network health metrics for connections between the PoP servers and the network branches 32a, 32b, at Block 92. Moreover, the PSC 35 also cooperates with the PoP servers 31a-31n to determine second network health metrics for connections between the PoP servers 31a-31n and the SaaS host servers 33a-33n, at Block 93. Using these health metrics, the PSC may advantageously determine and suggest to the network branches 32a, 32b the appropriate PoP server 31a-31n for the incoming traffic based on network dynamics, and thereby provide an enhanced application delivery network for a client requesting services from the cloud. In some embodiments, the PSC 35 may optionally determine respective health metrics for each of the PoP servers 31a-31n, at Block 94. More particularly, the PSC 35 may collect information from various POPs 31a-31n such as the POP server's health (a measure of system resource constraints) and the POP server's WAN health, which may be assessed by packet loss, latency, and/or jitter.

Figure 6:
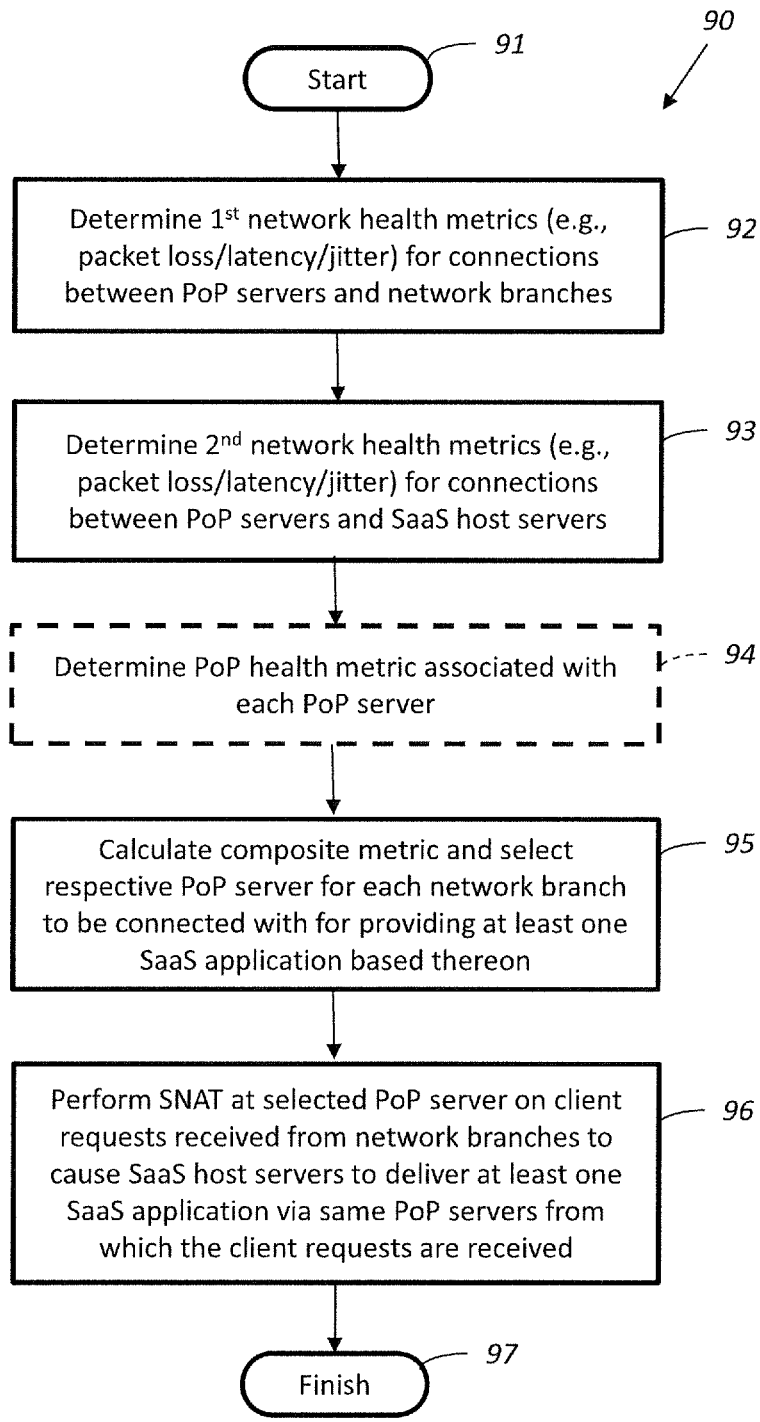
FIG. 6 is a flow diagram illustrating method aspects associated with the system of FIG. 2.

The PSC 35 may calculate a composite metric from the PoP and/or network health metrics it receives from the PoP servers 31a-31n, at Block 104. The PSC may accordingly select a respective one of the PoP servers 31a-31n for each network branch 32a, 32b to be connected with for providing the given SaaS application based upon the first and second network health metrics, at Block 95, as will be discussed further below. Source network address translation (SNAT) may also be performed to cause the SaaS host servers 33a-33n to deliver SaaS applications via the same PoP servers 31a-31n from which the client requests are received, at Block 96, which illustratively concludes the method of FIG. 6 (Block 97).

Figure 3:
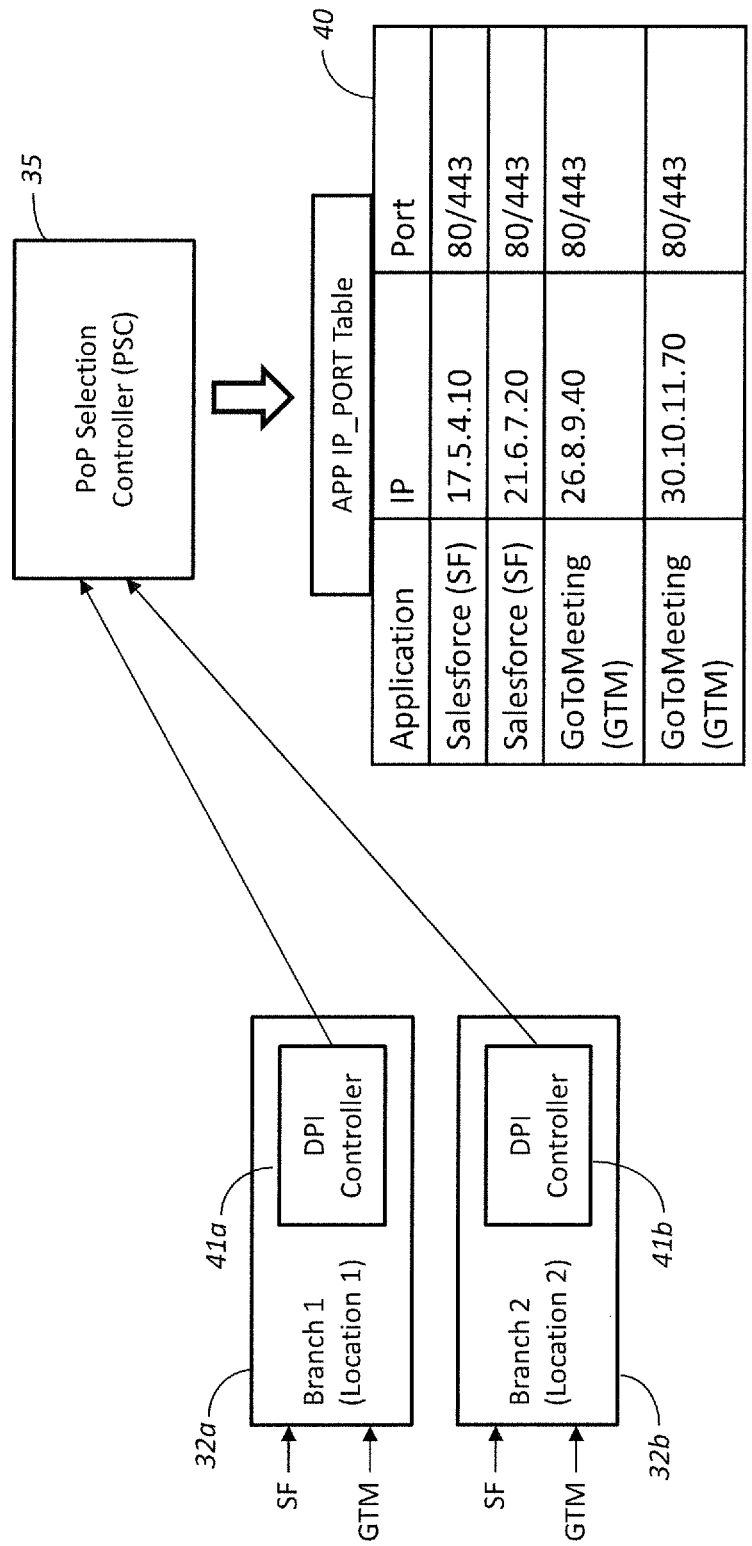
FIG. 3 is a schematic block diagram of the PoP Selection Controller (PSC) of FIG. 2 generating a PoP selection table in an example implementation.
Figure 4:
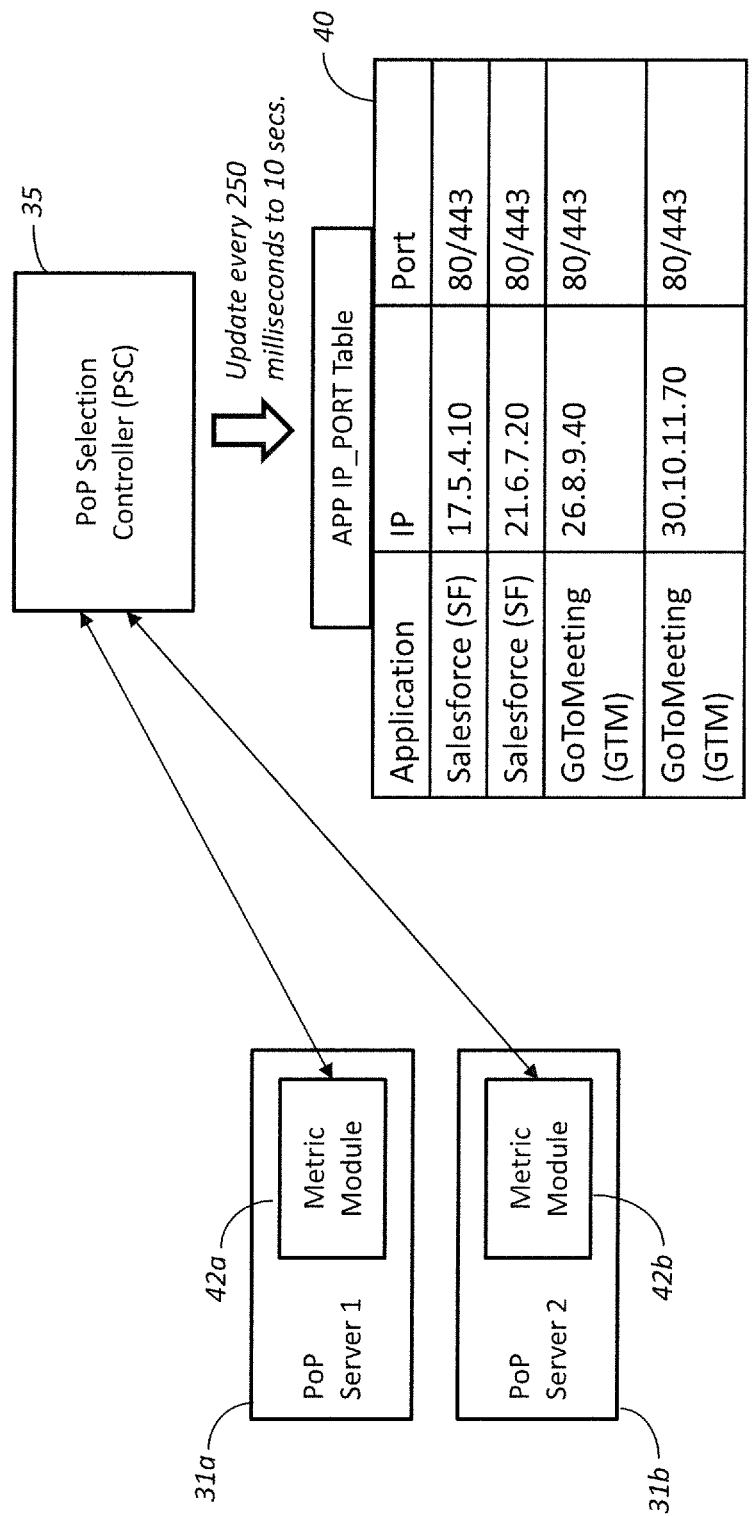
FIG. 4 is a schematic block diagram of the PSC from the example of FIG. 3 cooperating with different PoP servers to determine network health metrics associated with the various PoP server options in the PoP selection table.

Referring additionally to an example implementation shown in FIGS. 3-5, the PSC 35 maintains an up-to-date lookup table 40 of available PoP servers for delivering different SaaS services. In the illustrated example, the table 40 maintained by the PSC 35 illustratively includes a tuple of {Application, IP, port, best POP}. Incoming connections on each branch 32a, 32b are processed by deep packet inspection (DPI) controllers 41a, 41b to identify SaaS requests, and the PSC 35 cooperates with the DPI controller to build the table 40 of {Application: IP: Port}. Later the best ranked POP entry based upon the given selection criteria (e.g., lowest packet loss, least jitter, etc.) is populated in the table 40. Further, the available PoP servers 31a-31n may be stored in a ranked order in the table 40. In the present example, each of the branches 32a, 32b receives a request for Salesforce (SF) and GoToMeeting (GTM) applications, although the present approach may be used with many different SaaS applications or services.

In the illustrated example, respective peer metric modules 42a, 42b are instantiated on each of the PoP servers 31a, 31b. Each module 42a, 42b assesses the WAN health (e.g., packet loss, latency, and/or jitter) to each {application: IP: port} from their respective PoP servers. More particularly, the {application: IP: Port} table 40 may be obtained by the metric modules 42a, 42b from the PSC 35 so that each module may determine the WAN health to the different SaaS hosts 33a-33d (FIG. 5), as well as to the branches 32a, 32b, as noted above. Additionally each module 42a, 42b may also advantageously assess the health of its respective PoP server 31a, 31b for the PSC 35 to factor in with respect to the PoP selection process, if desired. The calculated WAN health metrics and the system metrics are shared with the PSC 35 from each PoP server 31a, 31b.

With this apparatus in place, any branch 32a, 32b requesting a service may contact the PSC 35 to get the PoP server 31a, 31b for the requested application having the best metrics associated therewith. In an example implementation, the exchange between the PSC 35 and the branches 32a, 32b may transpire using a light weight communication channel. Once the branch 32a or 32b receives the information on which PoP server 31a, 31b has the best metrics from this communication, that branch installs the given PoP server as the gateway in the application steering routing table, and thereby steers the packets from the branch to the end destination by tunneling them to the newly installed PoP server, from which the end service is reached.

An example metric calculation approach is now discussed which includes packet loss, latency, and jitter metrics (L/L/J metrics) by each module 42a, 42b. As noted above, there are two legs between the client requesting service and the SaaS host servers 33a-33d where the L/L/J metrics are to be calculated. The first leg is the network between the branches 32a, 32b and the POP servers 31a, 31b (LLJ_BR_POP), and the second leg is between the PoP servers and the SaaS host servers 33a-33d (LLJ_POP_SERVER). As such, the final or composite LLJ metric for end-to-end connectivity via any PoP server 31a, 31b is equal to LLJ_BR_POP+ LLJ_POP_SERVER. FIG. 5 shows an example of calculated health metrics from the PoP servers 31a, 31b to the various SaaS host servers 33a-33d. Here, the highest metric for Salesforce delivery is from PoP server 31b to the Salesforce host server 33a (metric score of 7). Furthermore, the highest metric for GTM delivery is from the PoP server 31a to the GTM host server 33a (metric sore of 14).

Various approaches may be used to measure the L/L/J metrics. For example, TCP data connections may be used to assess latency via packet, and its ACK for round trip time (RTT). Packet loss may be calculated via TCP retransmission timeouts (RTOs) and retransmissions. Furthermore, jitter may be calculated from the absolute value of the difference between the forwarding delays of two consecutive received packets belonging to the same stream. However, it should be noted that different approaches for calculating these network health metrics may be used in different embodiments, and that other health metrics may also be used as well. Thus, by determining the PoP server 31a, 31b having the best network health metrics associated therewith, a branch 32a, 32b (and therefore client) may obtain the best available application delivery network at a given point in time.

The modules 42a, 42b running on each PoP server 31a, 31b uses the {Application: IP: Port} info from the PSC 35 to assess the WAN health (L/L/J) metrics for each requested SaaS application (SF and GTM in the present example). The modules 42a, 42b, having fetched the unique IP:PORT list from the PSC's APP:IP_PORT mapping table 40, will assess the WAN health to the end SaaS host servers 33a-33d from the PoP servers 31a, 31b. This helps determine the L/L/J metric for the PoP servers 31a, 31b to each IP:PORT leg. This information is shared with the PSC 35, which updates the table 40 with the PoP information. The precedence or rank of the PoP servers 31a, 31b is marked by using the L/L/J metrics information shared from modules 42a, 42b. The table 40 may be updated in close to real time, e.g., in a range of milliseconds to several seconds. More particularly, in one example embodiment updates may be performed periodically in a range of 250 milliseconds to 10 seconds, but other durations may be used in different embodiments.

With the table 40 and rankings completed, traffic flow may begin using the appropriate PoP server 32a, 32b for the given SaaS application request. The first flow path is from the given branch 32a, 32b to the highest ranked PoP server 31a or 31b, which in one example implementation (assuming a Salesforce SaaS request) may be as follows:

1. Client will access Salesforce (e.g., through a browser);
2. The request will come to one of the network branches;
3. The receiving branch app routing table (which is already installed at the branch from the PSC 35) will indicate the best ranked PoP server 31a, 31b for Salesforce;
4. The branch tunnels the inner packet (i.e., initiator to the actual server IP obtained from the DNS) with an outer IP header;
5. Assuming that the Public IP address for which network address translation (NAT) is to be performed is known, the outer IP header may have the source (SRC) as the Public IP address of the given branch and destination (DST) as the PoP Public IP address (which is included in the routing table 40) and some designated tunnel ports which are understood by the system; and
6. The packets are sent over the tunnel to the designated PoP server.

The next flow path is from the designated PoP server 31a or 31b to the appropriate Salesforce SaaS host server 33a or 33b:

1. The given PoP server will de-capsulate the packet and get the inner payload;
2. Before sending, the PoP server will perform source NAT (SNAT) and put its Public IP address as the source IP address and the real destination server IP address remains; and
3. The PoP performs route lookup and sends the packet to the destination.

The next flow path is from the designated Salesforce SaaS host server 33a or 33b back to the PoP server 31a or 31b:

1. The SaaS host server will flip the source IP address and the destination IP address and will send the packet back in the reverse direction, which will now reach the original PoP server (i.e., the designated PoP server that forwarded the request) since the destination has been set to the PoP server's IP—this ensures that the return route from the SaaS host server goes through the same PoP server that forwarded the request; and
2. The PoP server will de-NAT the Public IP address and obtain the real internal payload Finally, the last leg is from the PoP server 31a, 31b back to the branch 32a, 32b:

1. The PoP server will use the flow tuple and tunnel so that the packet will be tunneled back to the destination branch;
2. The tunnel source is designated as the PoP server Public IP address, and the destination as the network branch Public IP address so that the packet reaches the intended branch;
3. Upon receipt, the branch will de-NAT with the NAT entries, and the inner destination will be known (the initiating client's LAN IP address); and
4. The branch will perform a destination lookup and send the packet to the internal LAN initiating client.

The above-described approach advantageously provides for a dynamic and reliable selection of different PoP servers to help optimize the delivery path. Moreover, it allows for an assessment of WAN health vectors (e.g., loss/latency/jitter) and PoP availability in substantially real time, and it provides the best end-to-end path based upon the designated metrics (instead of just using proximity as the only selection vector). By way of example, the PSC 35 may be implemented within a framework such as Citrix NetScaler SDWAN or as part of the Citrix Cloud strategy, although it may be implemented within other systems as well.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
a plurality of point of presence (PoP) servers coupled to a wide area network (WAN) and configured to receive client requests for at least one Software as a service (SaaS) application from a plurality of different network branches coupled to the WAN, and connect the network branches with a given SaaS host server from among a plurality of different SaaS host servers coupled to the WAN and providing the at least one SaaS application; and
a PoP selection controller (PSC) coupled to the WAN and comprising a processor and associated memory, the PSC cooperating with the PoP servers to
determine first network health metrics for connections between the PoP servers and the network branches,
determine second network health metrics for connections between the PoP servers and the SaaS host servers,
select a respective PoP server for each network branch to be connected with for providing the at least one SaaS application based upon the first and second network health metrics, and
update the first and second network health metrics over time and change the selected PoP servers for the network branches based upon the updated first and second network health metrics;
wherein the selected PoP server performs source network address translation (SNAT) on client requests received from the network branches by replacing a source address in the client requests with an address of the selected PoP server.

2. The computing system of claim 1 wherein the PSC is further configured to calculate composite health metrics for each PoP server based upon the first and second network health metrics associated therewith; and wherein the PSC selects the respective PoP server for each network branch based upon the composite health metrics.

3. The computing system of claim 1 wherein the PSC is further configured to determine a PoP health metric associated with each of the PoP servers; and wherein the PSC selects the respective PoP server for each network branch also based upon the PoP health metrics.

4. The computing system of claim 1 wherein at least one of the first and second network health metrics comprises packet loss metrics.

5. The computing system of claim 1 wherein at least one of the first and second network health metrics comprises latency metrics.

6. The computing system of claim 1 wherein at least one of the first and second network health metrics comprises jitter metrics.

7. The computing system of claim 1 wherein the PSC is further configured to maintain a lookup table of the PoP servers ranked based upon the first and second network health metrics.

8. The computing system of claim 7 wherein the PSC is further configured to update the lookup table at an interval in a range of 250 milliseconds to 10 seconds.

9. The computing system of claim 1 wherein each PoP server comprises a health metric module to calculate the first and second health metrics and provide the calculated first and second network health metrics to the PSC.

10. A method comprising:
determining first network health metrics for connections between a plurality of point of presence (PoP) servers coupled to a wide area network (WAN) and a plurality of network branches also coupled to the WAN at a PoP selection controller (PSC) comprising a memory and a processor cooperating with the memory;
determining second network health metrics for connections between the PoP servers and a plurality of Software as a Service (SaaS) host servers at the PSC;
selecting, at the PSC, a respective PoP server for each network branch to be connected with for providing at least one SaaS application based upon the first and second network health metrics, and for performing source network address translation (SNAT) on client requests received from the network branches by replacing a source address in the client requests with an address of the selected PoP server; and
updating the first and second network health metrics at the PSC over time and changing the selected PoP servers for the network branches based upon the updated first and second network health metrics.

11. The method of claim 10 further comprising calculating, at the PSC, composite health metrics for each PoP server based upon the first and second network health metrics associated therewith; and wherein selecting comprises selecting the respective PoP server for each network branch based upon the composite health metrics.

12. The method of claim 10 further comprising determining, at the PSC, a PoP health metric associated with each of the PoP servers; and wherein selecting comprises selecting the respective PoP server for each network branch also based upon the PoP health metrics.

13. The method of claim 10 wherein the first and second network health metrics comprise at least one of packet loss metrics, latency metrics, and jitter metrics.

14. A non-transitory computer-readable medium for a point of presence (PoP) server selection controller (PSC) having computer-executable instructions for causing the PSC to perform steps comprising:
determining first network health metrics for connections between a plurality of PoP servers coupled to a wide area network (WAN) and a plurality of network branches also coupled to the WAN;
determining second network health metrics for connections between the PoP servers and a plurality of Software as a Service (SaaS) host servers;
selecting a respective PoP server for each network branch to be connected with for providing the at least one SaaS application based upon the first and second network health metrics, and for performing source network address translation (SNAT) on client requests received from the network branches by replacing a source address in the client requests with an address of the selected PoP server; and
updating the first and second network health metrics over time and changing the selected PoP servers for the network branches based upon the updated first and second network health metrics.

15. The non-transitory computer-readable medium of claim 14 further having computer-executable instructions for causing the PSC to perform a step of calculating composite health metrics for each PoP server based upon the first and second network health metrics associated therewith; and wherein selecting comprises selecting the respective PoP server for each network branch based upon the composite health metrics.

16. The non-transitory computer-readable medium of claim 14 further having computer-executable instructions for causing the PSC to perform a step of determining a PoP health metric associated with each of the PoP servers; and wherein selecting comprises selecting the respective PoP server for each network branch also based upon the PoP health metrics.

17. The non-transitory computer-readable medium of claim 14 wherein the first and second network health metrics comprise at least one of packet loss metrics, latency metrics, and jitter metrics.

18. The non-transitory computer-readable medium of claim 14 further having computer-executable instructions for causing the PSC to perform a step of maintaining a lookup table of the PoP servers ranked based upon the first and second network health metrics.

19. The method of claim 10 further comprising determining composite health metrics at the PSC for end-to-end connectivity between the network branches and the SaaS host servers based upon the first and second network health metrics; and wherein selecting comprises selecting respective PoP servers for each network branch based upon the composite health metrics.

* * * * *